United States Patent Office 3,391,166
Patented July 2, 1968

3,391,166
(OPTIONALLY 17 - ALKYLATED) - 3α - METHYL-
17β - HYDROXY - 5α - ANDROSTAN - 1 - ONES
AND DERIVATIVES THEREOF
Paul D. Klimstra, Northbrook, Ill., assignor to G. D.
Searle & Co., Chicago, Ill., a corporation of Delaware
No Drawing. Filed June 17, 1965, Ser. No. 464,840
10 Claims. (Cl. 260—397.3)

The present invention relates to novel steroidal derivatives characterized by a 3-methyl substituent of the α configuration and, in particular, to (optionally 17-alkylated) - 3α-methyl-17β-hydroxy-5α-androstan-1-ones and derivatives thereof which can be represented by the following structural formula

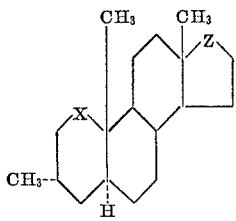

wherein X can be a carbonyl, α-hydroxymethylene or α-(lower alkanoyl)oxymethylene radical, and Z is a carbonyl, β-hydroxymethylene, β-(lower alkanoyl)oxymethylene or α-(lower alkyl)-β-hydroxymethylene group.

The lower alkyl radicals encompassed in the foregoing representation are methyl, ethyl, propyl, butyl, pentyl, hexyl, heptyl and the branched-chain groups isomeric therewith.

Examples of the lower alkanoyl groups depicted in that formula are formyl, acetyl, propionyl, butyryl, valeryl, caproyl, heptanoyl and the branched-chain isomers thereof.

Starting materials suitable for utilization in the manufacture of the compounds of the present invention are the 1α,2α-epoxy compounds represented by the following structural formula

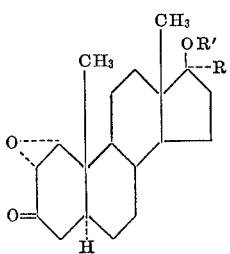

wherein R is hydrogen or a lower alkyl radical and R' is hydrogen, a lower alkanoyl, or tetrahydropyran-2-yl group. These materials together with methods for their manufacture and described by Counsell and Klimstra, J. Med. Pharm. Chem., 5, 477 (1962). When the latter substances are heated with hydrazine at elevated temperature, the corresponding 2-dehydro-1α-hydroxy derivatives are produced. Oxidation of the 1α-hydroxy group with a suitable reagent results in the 1-keto compounds corresponding. An example of the latter processes is the reaction with hydrazine of 17β-acetoxy-1α,2α-epoxy-5α-androstan-3-one to afford 5α-androst-2-ene-1α,17β-diol, which, in acetone, is oxidized with chromic acid, thus yielding 17β-hydroxy-5α-androst-2-en-1-one.

When the aforementioned 2-dehydro-1-keto compounds are allowed to react with an appropriate organometallic reagent such as methyl magnesium bromide and the initally formed adduct is decomposed, the instant 3α-methyl products are obtained. The above-described 17β-hydroxy-5α-androst-2-en-1-one, for example, upon reaction with methyl magnesium bromide in ether-tetrahydrofuran, in the presence of cuprous chloride, followed by aqueous decomposition of the Grignard adduct results in the instant 17β-hydroxy-3α-methyl-5α-androstan-1-one.

Reaction of the 1-keto group with a suitable reagent results in reduction to the 1α-hydroxy compounds. As a specific illustration, 17β-hydroxy-3α,17α-dimethyl-5α-androstan-1-one is contacted with lithium tri-(tertiary-butoxy)aluminum hydride in tetrahydrofuran, and the resulting complex is decomposed with dilute acetic acid to yield 3α,17α-dimethyl-5α-androstane-1α,17β-diol.

The hydroxy groups of the compounds of this invention are readily acylated, suitably by reaction with a lower alkanoic acid anhydride or halide, preferably in the presence of an acid acceptor. The instant 17β-hydroxy - 3α-methyl - 5α-androstan-1-one, for example, is allowed to stand in pyridine solution in contact with acetic anhydride, thus affording 17β-acetoxy-3α-methyl-5α-androstan-1-one. When two acylatable groups are present, as in 3α-methyl-5α-androstane-1α,17β-diol; the diacylates are produced. The reaction of the latter substance with acetic anhydride in pyridine thus produces 3α-methyl-5α-androstane-1α,17β-diol 1,17-diacetate.

The compounds of this invention are useful as a result of their valuable pharmacological properties. They are hormonal and anti-hormonal agents, for example, as is evidenced by their androgenic, anti-fertility and anti-estrogenic activity. These compounds are especially advantageous in view of their lack of certain hormonal side-effects, e.g., anabolic and progestational.

The invention will appear more fully from the examples which follow. These examples are given by way of illustration only and are not to be construed as limiting the invention either in spirit or in scope, as many modifications both in materials and methods will be apparent from this disclosure to those skilled in the art. In the following examples, temperatures are given in degrees centigrade (° C.) and quantities of material in parts by weight unless otherwise noted.

Example 1

A mixture of 2 parts of 17β-acetoxy-1α,2α-epoxy-5α-androstan-3-one and 31 parts of hydrazine hydrate is heated at about 90° for approximately 25 minutes, then at about 120° for approximately 15 minutes. The resulting mixture is cooled to about 5° and the supernatant layer is carefully decanted into water. The aqueous mixture is extracted with ether, and the ether layer is separated, then dried over anhydrous potassium carbonate containing decolorizing carbon. Removal of the solvent by distillation affords an oily residue which is partitioned between methanol and ether. The ether layer is separated, washed with water, dried over anhydrous potassium carbonate and concentrated to dryness under reduced pressure. Recrystallization of the resulting foam-like residue from acetone-hexane affords 5α-androst-2-ene-1α-17β-diol, melting at about 140–143°.

Example 2

A mixture of 1000 parts of 17β-hydroxy-5α-androst-1-en-3-one, 1200 parts of dihydropyran, 10,000 parts of methylene dichloride and one part of p-toluenesulfonic acid monohydrate is allowed to stand at room temperature for about 16 hours, then is washed with water, dried over anhydrous potassium carbonate containing decolorizating carbon and stripped of solvent by distillation under reduced pressure. The residual dark-colored oil is 17β-tetrahydropyran-2-yloxy-5α-androst-1-en-3-one.

To a solution of 20 parts of 17β-tetrahydropyran-2-yloxy-5α-androst-1-en-3-one in approximately 272 parts of methanol is added, at 5°, a solution of 25 parts of 30% hydrogen peroxide in approximately 6 parts of 10% methanolic sodium hydroxide. The resulting mixture is allowed to stand for about 20 minutes, then is poured into a mixture of ice and water. Extraction of the aqueous mixture first with methylene chloride, then with chloroform-methanol affords an organic solution which is washed with water, dried over anhydrous potassium carbonate containing decolorizing carbon and stripped of solvent by distillation under reduced pressure. The resulting yellow oily residue solidifies on standing, and that solid is recrystallized from aqueous methanol to yield 1α,2α-epoxy-17β-tetrahydropyran - 2 - yloxy-5α-androstan-3-one, melting at about 123–125°.

A mixture of 4 parts of 1α,2α-epoxy-17β-tetrahydropyran-2-yloxy-5α-androstan-3-one and 62 parts of 85% hydrazine hydrate is heated at 90–100° for about 5 minutes, then at about 120° for about 20 minutes. The resulting mixture is cooled, and the supernatant layer is decanted and discarded. The semi-solid residue is extracted with methanol, and the methanol solution is diluted carefully with approximately 300 parts of cold water. The resulting precipitate is collected by filtration, washed with water and dried in air to afford 17β-tetrahydropyran-2-yloxy-5α-androst-2-en-1α-ol.

To a solution of 3 parts of 17β-tetrahydropyran-2-yloxy-5α-androst-2-en-1α-ol in approximately 36 parts of acetone is added dropwise an aqueous solution, 8 N in chromium trioxide and 8 N in sulfuric acid, until a slight excess of the reagent is present. The addition of a small quantity of isopropanol destroys the excess reagent, and the resulting precipitated inorganic salts are removed by filtration. The filtrate is poured into excess cold aqueous dilute sodium bicarbonate, and the resulting alkaline mixture is extracted with ether. The ether extract is separated, washed with water, dried over anhydrous potassium carbonate containing decolorizing carbon and stripped of solvent by distillation under reduced pressure to yield, as an oil, 17β-tetrahydropyran-2-yloxy-5α-androst-2-en-1-one.

To a solution of 13 parts of 17β-tetrahydropyran-2-yloxy-5α-androst-2-en-1-one in 200 parts of acetone is added a solution of 5 parts of p-toluenesulfonic acid monohydrate in 80 parts of methanol. The resulting mixture is heated at the reflux temperature for about 15 minutes, then is allowed to stand at room temperature for about 48 hours. This reaction mixture is then diluted with water, and the precipitate which forms is collected by filtration, washed on the filter with water and dried by air. Chromatography on silical gel followed by elution with 5% ethyl acetate in benzene affords the crude product, which is purified by recrystallization from acetone-hexane to yield pure 17β-hydroxy-5α-androst-2-en-1-one, melting at about 179–181°.

Example 3

To 50 parts by volume of 3 M ethereal methyl magnesium bromide in 89 parts by tetrahydrofuran, in a nitrogen atmosphere at 0–5° with vigorous stirring, is added successively 0.8 part of cuprous chloride and a solution of 5 parts of 17β-hydroxy-5α-androst-2-en-1-one in 89 parts of tetrahydrofuran over a period of about 30 minutes. The resulting reaction mixture is stirred for about 15 minutes longer, then is poured carefully into a mixture of saturated aqueous sodium chloride and ether. The layers are then separated, and the ether layer is washed successively with 5% hydrochloric acid, saturated aqueous sodium chloride, 5% aqueous sodium hydroxide and saturated aqueous sodium chloride, then is dried over anhydrous sodium sulfate containing decolorizing carbon. Removal of the solvent by distillation under reduced pressure affords the crude product as a solid residue. That material is purified by recrystallization from acetone-hexane to afford pure 17β-hydroxy-3α-methyl-5α-androstan-1-one, melting at about 135–136°. This compound exhibits also an optical rotation of +146.5° in chloroform and can be represented by the following structural formula:

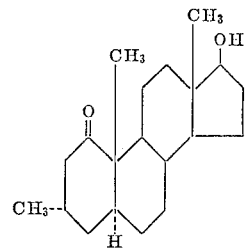

Example 4

To a solution of one part of 17β-hydroxy-3α-methyl-5α-androstan-1-one in 22.5 parts of tetrahydrofuran is added, at 0–5°, a solution of 4 parts of lithium tri-(tertiary-butoxy)aluminum hydride in 22.5 parts of tetrahydrofuran. The resulting reaction mixture is stirred at room temperature for about one hour, then is poured carefully into a mixture of ice and water containing excess dilute acetic acid. That mixture is then extracted with ether, and the ether layer is separated, washed successively with water and 5% aqueous sodium bicarbonate, then dried over anhydrous sodium sulfate. The volatile organic solvents are removed by distillation under reduced pressure, and the residual oily crude product is purified by recrystallization from aqueous methanol to afford pure 3α-methyl-5α-androstane-1α,17β-diol, melting at about 108–110°. It exhibits also an optical rotation of +34° chloroform and can be represented by the following structural formula

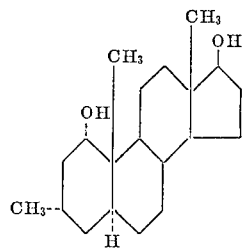

Example 5

To a solution of one part of 17β-hydroxy-3α- methyl-5α-androstan-1-one in 12 parts of acetone is added dropwise an aqueous solution, 8 N in chromium trioxide and 8 N in sulfuric acid, until a slight excess of the reagent is present. Decomposition of the excess reagent by the addition of a small quantity of isopropyl alcohol followed by filtration of the resulting mixture through diatomaceous earth affords an organic solution which is carefully diluted with water. The precipitate which forms is collected by filtration, then is purified by recrystallization from aqueous acetone to yield 3α-methyl-5α-androstane-1,17-dione, melting at about 154–156°. This compound exhibits an optical rotation of +221°, in chloroform, and is further characterized by the following structural formula

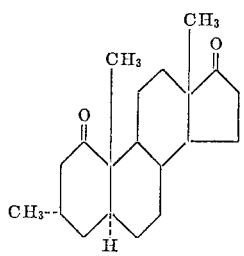

Example 6

A mixture of 8 parts of 1α,2α-epoxy-17β-hydroxy-17α-methyl-5α-androstan-3-one with 124 parts of 100% hydrazine hydrate is kept at room temperature for about 30 minutes, then is heated first at 90–100° for about 15 minutes, and finally at 100° for about 15 minutes. Upon cooling, the reaction mixture separates into a two-phase system consisting of a solid and a supernatant oily layer. The oil is decanted carefully into water, and the resulting precipitate is collected by filtration and combined with the original solid material. The combined solids are extracted with methanol, and the methanol extract is poured into a mixture of ice and water. The resulting precipitate is collected by filtration, washed successively with dilute hydrochloric acid, aqueous sodium bicarbonate and water, then dried in air to afford the crude product. Recrystallization from aqueous methanol produces 17α-methyl-5α-androst-2-ene-1α,17β-diol, melting at about 102–104°.

To a solution of 2 parts of 17α-methyl-5α-androst-2-ene-1α,17β-diol in 96 parts of acetone is added, at room temperature with stirring, an aqueous solution, 8 N in chromium trioxide and 8 N in sulfuric acid. Addition of approximately one part of isopropyl alcohol results in decomposition of the excess reagent whereupon the inorganic salts which precipitate are removed by filtration. The resulting filtrate is diluted carefully with water, and the precipitate which forms is collected by filtration, washed on the filter with water and dried in air to yield 17β-hydroxy-17α-methyl-5α-androst-2-en-1-one, melting at about 153–155°.

Example 7

To 50 parts by volume of ethereal methyl magnesium bromide in 89 parts of tetrahydrofuran, in a nitrogen atmosphere, is added successively, with stirring and cooling at 0–5°, 0.8 part of cuprous chloride and a solution of 5 parts of 17β-hydroxy-17α-methyl-5α-androst-2-en-1-one in 89 parts of tetrahydrofuran over a period of about 25 minutes. The resulting reaction mixture is stirred for about 30 minutes longer, then is poured carefully into a two-phase system comprising ether and an aqueous solution prepared from dilute hydrochloric acid and saturated aqueous sodium chloride. The layers are separated, and the aqueous layer is extracted with ether. The ether extracts are combined, washed first with dilute aqueous sodium hydroxide containing sodium chloride, then with aqueous sodium chloride. The washed solution is dried over anhydrous sodium sulfate containing decolorizing carbon, then is stripped of solvent by distillation under reduced pressure. Recrystallization of the residual solid from acetone produces 17β-hydroxy-3α,17α-dimethyl-5α-androstan-1-one, melting at about 193–195°. This compound can be represented by the following structural formula

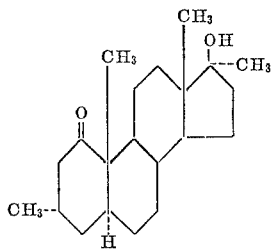

Example 8

To a solution of 1.2 parts of 17β-hydroxy-3α,17α-dimethyl-5α-androstan-1-one in 16 parts of tetrahydrofuran, under nitrogen, is added, at 0–5° with stirring, a solution of 5 parts of lithium tri-(tertiary-butoxy) aluminum hydride in 11 parts of tetrahydrofuran. The resulting reaction mixture is stirred for about 3 hours, then is poured carefully into a mixture of 10% acetic acid and ice. The precipitate which forms is collected by filtration, washed on the filter with water and dried in air. Recrystallization of that crude product from aqueous methanol results in pure 3α,17α-dimethyl-5α-androstane-1α,17β-diol, melting at about 174–175°. This compound can be represented by the following structural formula.

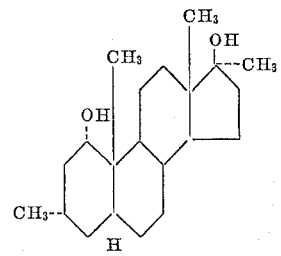

Example 9

A solution of 5 parts of 3α-methyl-5α-androstane-1,17-dione and 5 parts of redistilled ethylene glycol in 88 parts of benzene is azeotropically distilled in order to remove water. To the resulting anhydrous reaction mixture is added 0.035 part of p-toluenesulfonic acid monohydrate, and refluxing is continued for about 5 hours. The resulting mixture is cooled, then diluted with ether, and that organic solution is washed with water, dried over anhydrous potassium carbonate containing decolorizing carbon and stripped of solvent by distillation under reduced pressure.

The latter oily residue containing 3α-methyl-5α-androstane-1,17-dione 17-ethylene ketal is dissolved in 105 parts of ether, and that organic solution is added dropwise over a period of about 30 minutes to a slurry of 7 parts of lithium aluminum hydride with 53 parts of ether. That mixture is heated at the reflux temperature for about 3 hours, after which time ethyl acetate is added dropwise with cooling in order to destroy the excess reagent. The organic layer is separated, washed successively with saturated aqueous ammonium chloride and water, then dried over anhydrous sodium sulfate containing decolorizing carbon. Removal of the solvent by distillation under reduced pressure affords 1α-hydroxy-3α-methyl-5α-androstan-17-one 17-ethylene ketal.

The latter ketal is dissolved in 240 parts of ethyl alcohol, and approximately 50 parts of water is added. To that solution is then added 4.8 parts of hydrochloric acid, and the resulting reaction mixture is stirred at room temperature for about 3 hours. That mixture is then diluted with water and made alkaline by the addition of 5% aqueous sodium bicarbonate. Removal of the solvent in vacuo affords a residue which is extracted with ether, and the organic solution is washed with water, then dried over anhydrous potassium carbonate containing decolorizing carbon. The volatile organic solvents are removed by distillation under reduced pressure to afford the crude solid product. Recrystallization from aqueous methanol affords 1α-hydroxy-3α-methyl-5α-androstan-17-one, characterized by infrared absorption maxima, in chloroform, at about 2.75, 3.41 and 5.75 microns. This compound can be represented by the following structural formula

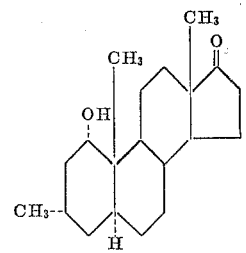

Example 10

A mixture containing 1.5 parts of 17β-hydroxy-3α-methyl-5α-androstan-1-one, 20 parts of pyridine and 10 parts of acetic anhydride is allowed to stand at room temperature for about 16 hours, then is carefully poured into cold water. The resulting aqueous mixture is kept at room temperature for about 30 minutes, and the precipitated crude product is collected by filtration, then washed on the filter with water. Recrystallization from aqueous methanol results in 17β-acetoxy-3α-methyl-5α-androstan-1-one, melting at about 156–157°. This compound can be represented by the following structural formula

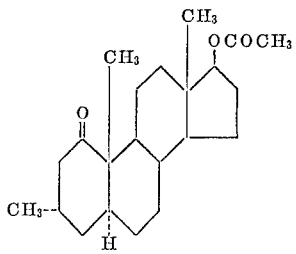

Example 11

When an equivalent quantity of propionic anhydride is substituted in the procedure of Example 10, there is obtained 3α - methyl-17β-propionoxy-5α-androstan-1-one.

Example 12

When an equivalent quantity of 3α-methyl-5α-androstane-1α,17β-diol is allowed to react with acetic anhydride by the procedure described in Example 10, there is obtained 3α-methyl-5α-androstane-1α,17β-diol 1,17-diacetate.

Example 13

The substitution of an equivalent quantity of 17α-ethyl-17β-hydroxy-5α-androst-2-en-1-one in the procedure described in Example 7 results in 17α-ethyl-17β-hydroxy-3α-methyl-5α-androstan-1-one.

Example 14

The reduction of an equivalent quantity of 17α-ethyl-17β-hydroxy-3α-methyl-5α-androstan-1-one by the process described in Example 8 results in 17α-ethyl-3α-methyl-5α-androstane-1α,17β-diol.

Example 15

When equivalent quantities of 3α-methyl-5α-androstane-1α,17β-diol and propionic anhydride are allowed to react according to the procedure described in Example 10, there is obtained 3α-methyl-5α-androstane-1α,17β-diol 1,17-dipropionate.

What is claimed is:
1. A compound of the formula

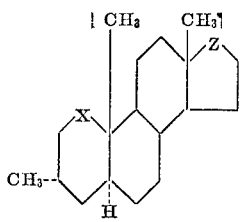

wherein X is selected from the group consisting of carbonyl, α-hydroxymethylene, and α-(lower alkanoyl)oxymethylene radicals, and Z is a member of the class consisting of carbonyl, β-hydroxymethylene, β-(lower alkanol)oxymethylene and α-(lower alkyl)-β-hydroxymethylene radicals.

2. A compound of the formula

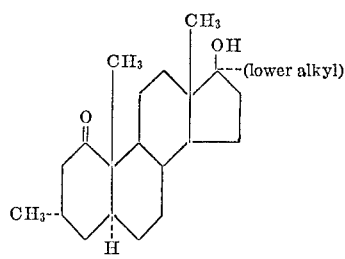

3. A compound of the formula

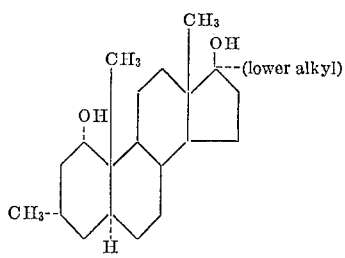

4. A compound of the formula

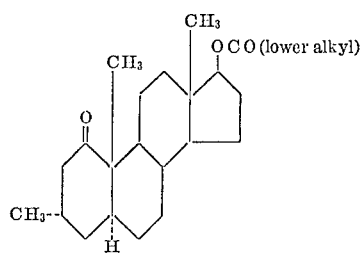

5. 17β-hydroxy-3α-dimethyl-5α-androstan-1-one.
6. 3α,17α-dimethyl-5α-androstane-1α,17β-diol.
7. 17β-hydroxy-3α-methyl-5α-androstan-1-one.
8. 3α-methyl-5α-androstane-1,17-dione.
9. 3α-methyl-5α-androstane-1α,17β-diol.
10. 17β-acetoxy-3α-methyl-5α-androstan-1-one.

References Cited

UNITED STATES PATENTS 3,257,428   6/1966   Klimstra _____ 260—397.4

ELBERT L. ROBERTS, *Primary Examiner.*

E. G. LOVE, *Assistant Examiner.*